Patented Dec. 25, 1945

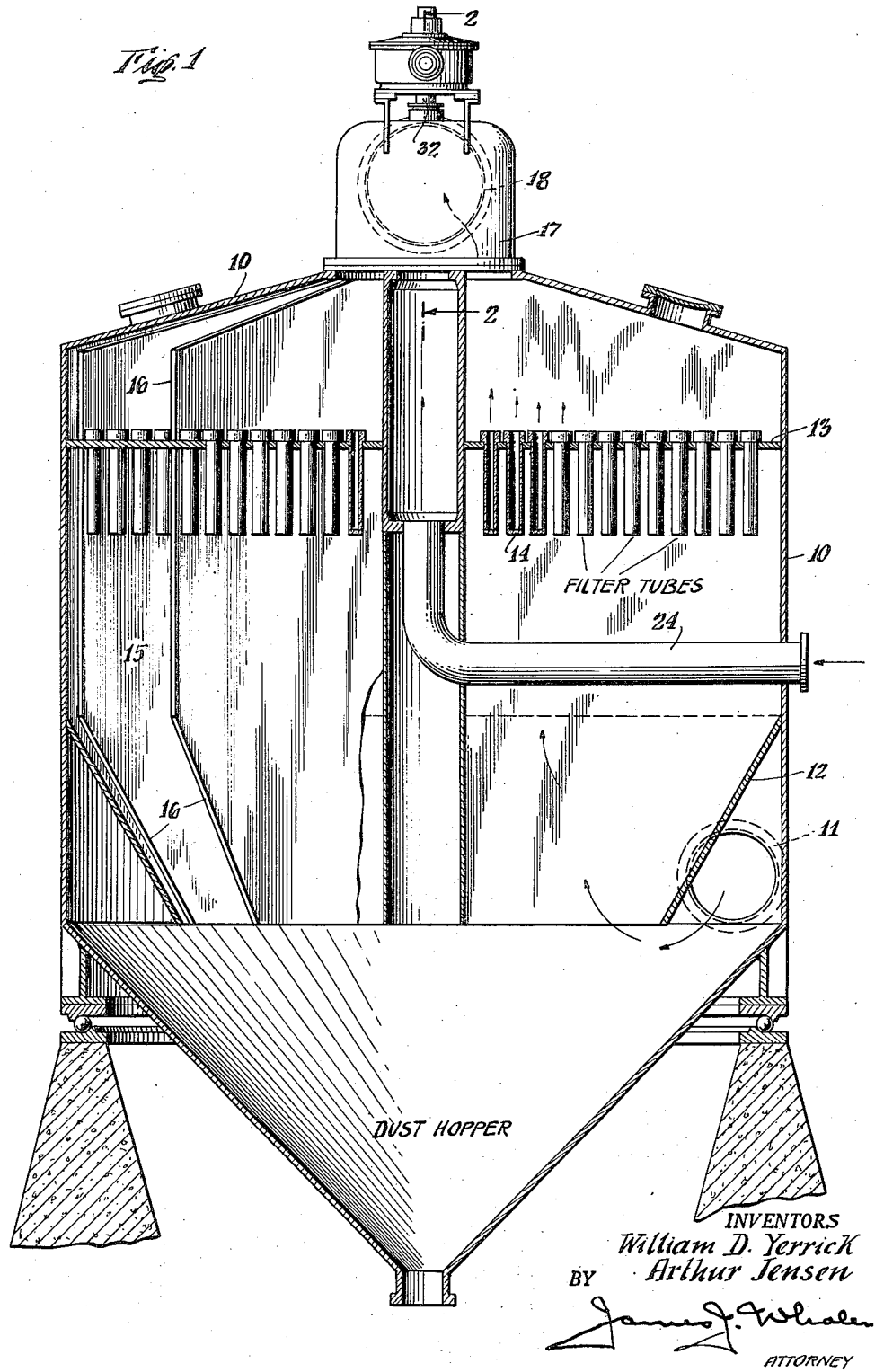

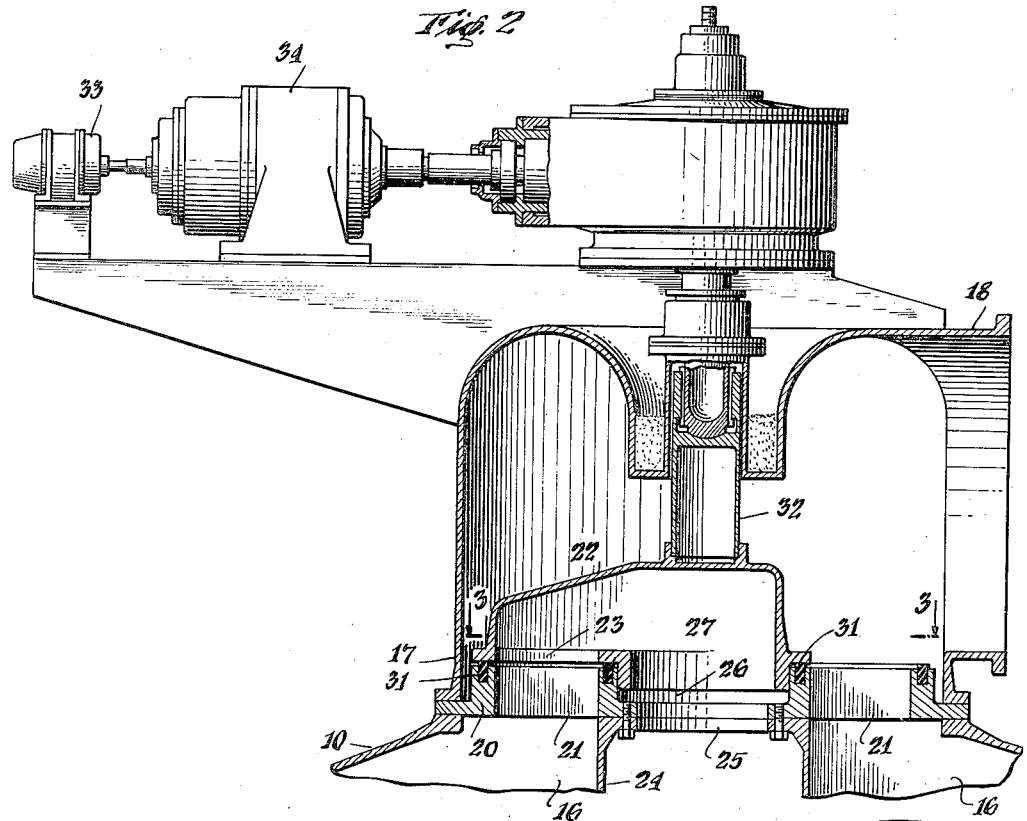
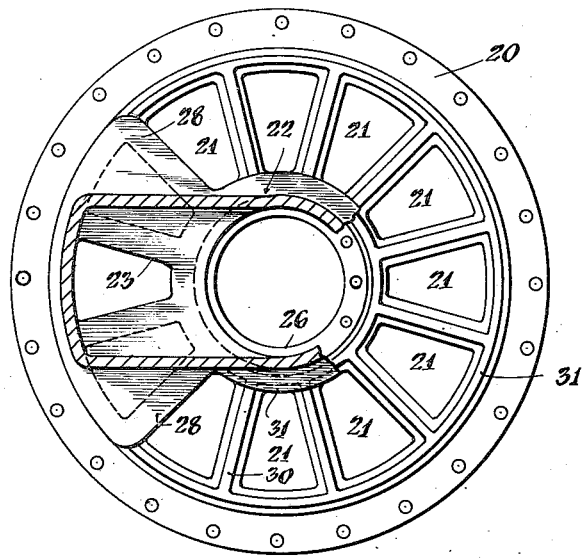
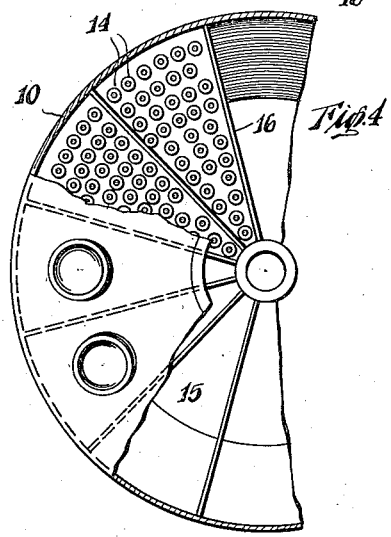
INVENTORS
William D. Yerrick
Arthur Jensen
BY
ATTORNEY

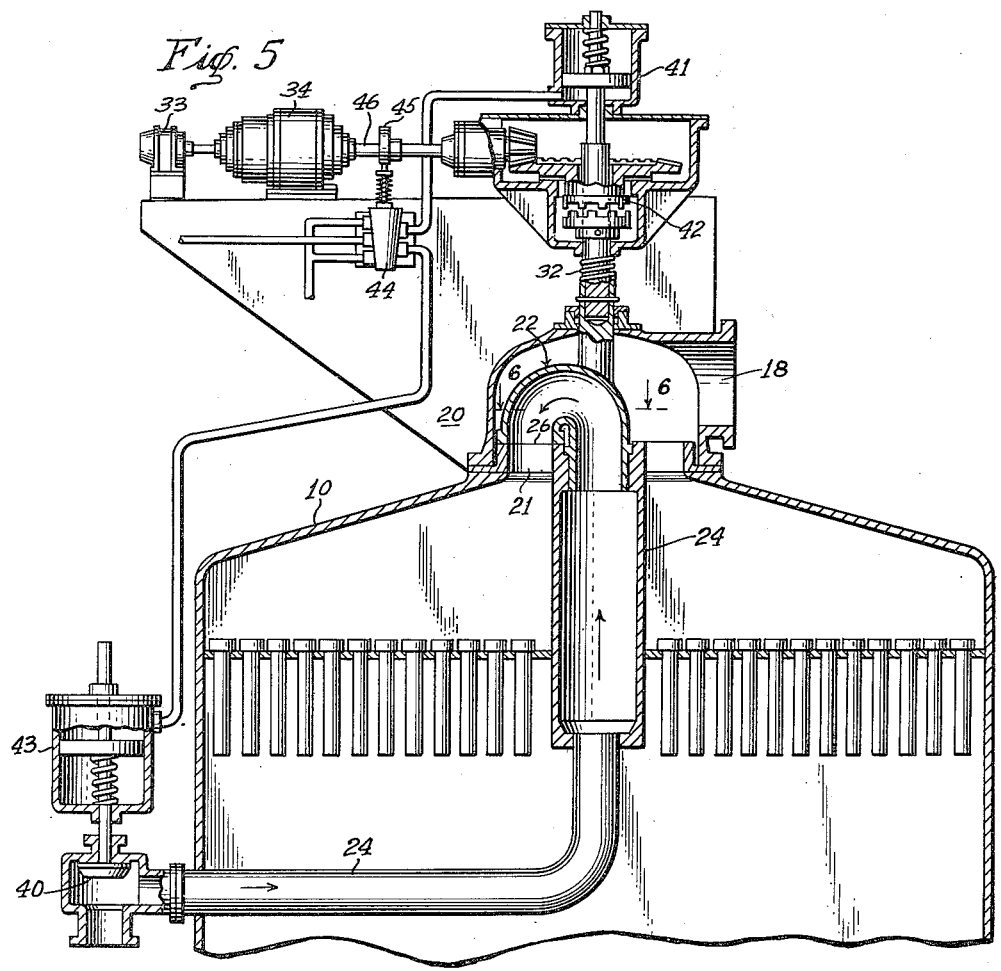
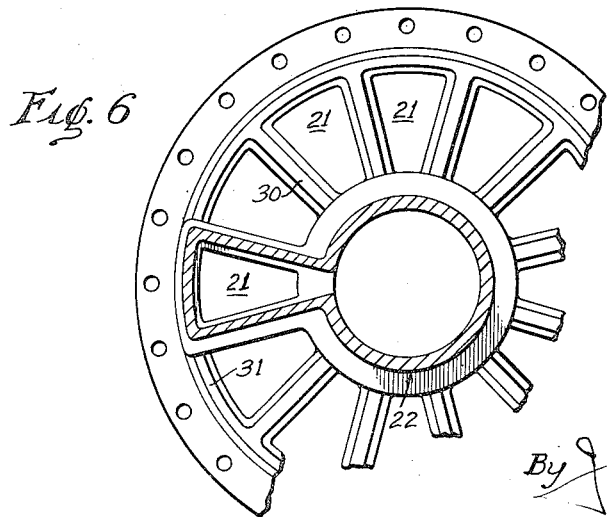

2,391,534

UNITED STATES PATENT OFFICE 2,391,534

SEPARATOR

William D. Yerrick and Arthur Jensen, Wellsville, N. Y., assignors to The Air Preheater Corporation, New York, N. Y.

Application June 2, 1944, Serial No. 538,402

3 Claims. (Cl. 183—57)

The present invention relates to material separating apparatus and particularly to improvements in apparatus especially adapted for filtering fine particles from a gaseous fluid.

The invention is directed to a filter for recovering valuable catalytic material from a gas stream and utilizes apparatus of the type in which dust-laden gases pass through a chamber containing porous filtering tubes on the walls of which the dust is disentrained. In filtering very fine particles from gases, the filtering elements tend to become clogged quickly and usually it is necessary to remove the apparatus from service for cleaning. The present invention contemplates an improved apparatus for continuously and efficiently cleaning fine particles of material from the filter tubes of such apparatus without taking the entire apparatus out of use.

The invention will be best understood upon consideration of the following detailed description of illustrative embodiments thereof when read in conjunction with the accompanying drawings in which:

Figure 1 is a sectional elevation of a dust separator embodying the present invention;

Fig. 2 is an enlarged view of the upper part of the apparatus shown in Fig. 1.

Figure 3 is a transverse sectional view on the correspondingly designated section line in Figure 2.

Fig. 4 is a fragmentary plan view of the separator with parts broken away to illustrate details of construction.

Figure 5 is an elevational view similar to Figure 1 of a modified form of apparatus and Figure 6 is a sectional view on the line 6—6 in Figure 5.

The dust separator comprises a housing 10 cylindrical in form to which dust-laden gas is admitted through a tangentially located inlet 11 to be deflected around the casing by contact with a frusto-conical baffle 12 located opposite the inlet and attached to the inner wall of casing 10 above the inlet. Below the inlet 11 the walls of the housing 10 converge to form a dust hopper. Near the upper end of casing 10 a transverse partition 13 is formed with a plurality of apertures providing seats for filter tubes 14, a number of which depend into the lower part of each of a number of compartments 15 formed by radial diaphragms 16 extending from adjacent baffle 12 to the base of a centrally located neck portion 17 in the side of which the outlet 18 for clean gases is formed. The filter tubes have porous walls for separating the dust from the gases as the latter pass into the center of the tubes through their walls to flow from their open upper ends into the parts of compartments 15 above the partition 13, the lower ends of these tubes being closed.

As dust-laden gases enter the housing 10 through the tangential inlet 11 they strike against the baffle 12 which by deflecting them slows them down and also causes them to change their direction since they must flow around the lower edge of the baffle in their travel to the filter tubes 14. The larger particles of material are disentrained from the gases by the changes in velocity and direction and fall into the dust hopper. Rising within the casing 10 at reduced velocity the gases pass through the walls of the porous filter tubes 14 and the finer particles are disentrained by these tubes so that the clean gases flow from the upper ends in the tubes into the space above the partition 13 to be discharged from the separator through the clean gas outlet 18.

As is shown in Figs. 3 and 4 a ported partition or seal plate 20 is mounted at the upper ends of the diaphragms 16 and is formed with a plurality of ports 21 each alining with one of the various compartments 15 formed thereby. Mounted for rotation on the seal plate 20 about the vertical axis of the housing is a nozzle head 22 having a port 23 adapted to aline in succession with the various ports 21 in the sealing ring 20 for admitting blow-back gas into the particular compartment opposite the nozzle 22. The blow-back gas is supplied to the nozzle 22 through a conduit 24 extending through the side wall of the housing 10 and upwardly to connect with a central opening 25 in seal plate 20 that registers continuously with port 26 at the inner end of the duct 27 in the nozzle head. The nozzle 22 has lateral apron-like extensions 28 which obscure the ports 21 leading to the two compartments at either side of that with which its discharge port 23 is in registration. These with sealing strips and rings 30, 31 confine the blow-back to the filter tubes of a single compartment. Connected to the nozzle 22 and projecting through the top of the housing is a shaft 32 driven by a motor 33 through a speed reducer 34 for slowly rotating the nozzle 22 about the axis of the housing to register successively with the various compartments so that clean blow-back gas at a pressure higher than the dust laden gas may be directed through the filter tubes 14 in each compartment 15 in succession. While the tubes in any compartment are being cleaned the remainder of the tubes except for those in the two compartments immediately adjacent the nozzle remain effective for the filtering purposes since the dust-laden gas continues to flow through the latter.

In the form shown in Figs. 5 and 6 a shut-off valve 40 provided in the supply pipe 24 for the clean blow-back gas is automatically closed when a hydraulic motor 41 periodically lifts the nozzle head 22 and operatively connects it to a continuously rotating clutch part 42 so that it may be turned to register with another compartment. By operating a motor 43, the valve 40 and the control for hydraulic motor 41 in proper synchronized relation through a fluid distributing valve 44 operated by a cam 45 on drive shaft 46 the supply of blow-back gas is cut off during the time that the cleaning nozzle 22 is raised and being moved from registration with one compartment to the next. With this form it is unnecessary to cover the upper ends of compartments at either side of the nozzle head 22 because the arrangement for shutting off the supply of blow-back gas assures that it will be blown into one compartment at a time. Inasmuch as this arrangement does not require that a compartment at each side of that being blown back also be placed out of operation so far as filtering is concerned, it will be seen that to handle a predetermined volume of dust-laden gas a fewer number of filter tubes are required and therefore the size of the apparatus may be reduced.

What we claim is:

1. Dust filtering apparatus comprising; a casing formed with an inlet for dust laden gas and a clean gas outlet spaced axially of the casing from said inlet; means forming a dust hopper at the bottom of said casing; partition means extending across said casing intermediate said gas inlet and outlet and formed with a plurality of apertures distributed substantially uniformly of said partition means; a plurality of porous-walled filter tubes seated in said openings for disentraining dust from gases flowing through the walls of said tubes; a cleaning nozzle having a fluid port facing and adapted to aline with corresponding ends of each of a group of adjacent tubes; means for supplying a cleaning fluid to said nozzle; means for moving said nozzle axially of said housing to and from a position with respect to the ends of said filter tubes wherein the cleaning fluid is confined to the tubes alined with the nozzle port; means for periodically moving said nozzle from said position and traversing it with respect to said partition means for alinement with another group of tubes; and valve means operative upon movement of said nozzle for discontinuing the supply of fluid thereto.

2. Dust filtering apparatus comprising; a casing formed with an inlet for dust laden gas and a clean gas outlet spaced axially of the casing from said inlet; means forming a dust hopper at the bottom of said casing; radial diaphragms extending axially of said casing intermediate said inlet and outlet and terminating short of the latter for forming compartments in said casing; filtering means in said compartments; a cleaning nozzle disposed above the upper ends of said diaphragms and having a fluid port adapted to aline with said compartments successively; means for supplying a cleaning fluid to said nozzle; cooperative sealing means associated with the upper ends of said diaphragms and said nozzle for confining fluid to the compartment alined with said nozzle; means for moving said nozzle axially of said housing to and from a position with respect to the ends of said compartments wherein the cleaning fluid is confined to a compartment alined with the nozzle port; means for periodically moving said nozzle from said position and moving it about the axis of said casing into alinement with another compartment; and valve means operative upon movement of said nozzle for discontinuing the supply of fluid thereto.

3. Fluid treating apparatus comprising; a casing formed with fluid inlet and outlet connections spaced axially thereof; radial diaphragms extending axially of said housing intermediate said inlet and outlet and terminating short of the latter for forming compartments in said housing; means in said compartments for contact by fluid flowing between said inlet and outlet; a nozzle member disposed above the upper ends of said diaphragms and having a fluid port adapted to aline with said compartments successively; means for supplying a fluid to said nozzle; cooperative sealing means associated with the upper ends of said diaphragms and said nozzle for confining its fluid to the compartment alined therewith; means for moving said nozzle axially of said housing to and from a position with respect to the ends of said compartments wherein its fluid is confined to a compartment alined with the nozzle port; means for periodically moving said nozzle from said position and traversing it with respect to said partition means into alinement with another compartment; and valve means operative upon movement of said nozzle for discontinuing the supply of fluid thereto.

WILLIAM D. YERRICK.
ARTHUR JENSEN.